United States Patent

Becraft

[11] Patent Number: 5,152,139
[45] Date of Patent: Oct. 6, 1992

[54] HYDRAULIC TORQUE CONVERTER

[75] Inventor: Gene R. Becraft, Riverview, Mich.

[73] Assignee: Ford Motor Company, Dearborn, Mich.

[21] Appl. No.: 757,378

[22] Filed: Sep. 10, 1991

Related U.S. Application Data

[62] Division of Ser. No. 411,442, Sep. 22, 1989, Pat. No. 5,058,027.

[51] Int. Cl.$^5$ .............................. F16D 33/00
[52] U.S. Cl. ........................... 60/330; 60/361
[58] Field of Search ............ 364/468, 474.24, 512, 364/431.01, 505, 492, 495, 578, 424.1; 60/330, 361, 362

[56] References Cited

U.S. PATENT DOCUMENTS

| | | | |
|---|---|---|---|
| 3,220,187 | 11/1965 | Perkins | 60/362 X |
| 3,503,209 | 3/1970 | Loffelholz | 60/361 |
| 4,186,557 | 2/1980 | Arai et al. | 60/361 |
| 4,841,729 | 6/1989 | Mori | 60/361 |

Primary Examiner—Edward K. Look
Assistant Examiner—Todd Mattingly
Attorney, Agent, or Firm—Roger L. May; Frank G. McKenzie

[57] ABSTRACT

A method for forming a torque converter flow path defined by an impeller, a turbine and a stator comprising initiating a meanline design path having an outer radius R1 and an inner radius R2 connected by a tangent line, wherein the outer radius is initially set equal to maximum meanline design offset so as to extend to a meanline design path point at a radius R3 equalling $\sqrt{(R8)^2 - A/2\pi}$, and the inner radius is set equal to the outer radius so as to extend to a meanline design path point at R4 equaling $\sqrt{(R7)^2 + A/2\pi}$, wherein (R8) and (R7) are the maximum and minimum radial distances, respectively, from the flow path to the torque axis. The method further comprises generating an outer dimensional representation of the flow path, reducing the outer radius R1 and inner radius R2 equally until a maximum offset of the outer contour of the flow path matches the maximum allowable offset, increasing the outer radius with respect to the inner radius to reach a second outer contour point corresponding to the maximum axial offset, and reducing the outer radius to provide a smooth taper inwardly from the maximum axial offset. Preferably, the area through the flow path is constant in accordance with conventional design practice, and the outer and inner contour points are determined along a plurality of element lines by a computer program. The method results in a torque converter design in which the meanline design path has an outer radius greater than the inner radius.

15 Claims, 6 Drawing Sheets

HYDRAULIC TORQUE CONVERTER

This is a divisional of copending application Ser. No. 07/411,442, filed on Sep. 22, 1989, now U.S. Pat. No. 5,058,027.

BACKGROUND OF THE INVENTION

1. Field of the Present Invention

The present invention relates generally to motor vehicle transmissions and, more particularly, to a torque converter of the type used in automatic transmissions whose torus shape has a reduced axial dimension.

2. Description of the Prior Art

It is well known that torque converters used in automatic transmissions include an impeller which is driven by an engine shaft or the like, a turbine which responds to hydraulic fluid discharged from the impeller, and a stator positioned between the outlet of the turbine and the inlet of the impeller to multiply the torque delivered to the output shaft driving the speed change mechanism of the transmission. These members are disposed in a toroidal chamber. A median section through the toroid illustrates a generally annular flow path through the impeller, the turbine and the stator between outer and inner housings of each component.

The performance of torque converters is conventionally characterized by the ratio of the rotary speed of the turbine to the impeller speed as well as by the impeller input torque. The known hydraulic torque converters are designed as a compromise between an impeller to turbine speed ratio as close as possible to one and a low impeller input torque. To increase the efficiency of the torque converter, a conventional engineering practice has been to maintain the flow volume constant through the flow path by maintaining the product of the diameter of a circle touching the inner and outer walls of the torus and the distance from the center of the circle to the axis of the torus at a constant value. Such design considerations are referred to in U.S. Pat. No. 3,503,209 and S.A.E. design practices exhibited in Jandasek, V. J., THE DESIGN OF A SINGLE-STAGE, THREE-ELEMENT TORQUE CONVERTER, FOR PASSENGER CAR AUTOMATIC TRANSMISSIONS, Volume 1, 1962.

Attempts to depart from this conventional understanding have resulted in torque converter constructions having less efficiency or greater torque losses than may be desirable. For example, U.S. Pat. No. 4,186,557 to Arai et al discloses a turbine modification in torque converters where the torus has a median section with an axial dimension smaller than its dimension in a direction perpendicular to the axis of the torus. The patent addresses the problem of eddy currents through the main passageways in such a construction by maximizing the area of the flow path at the inlet of the turbine and thereafter reducing the torus flow area. While such variations of the flow path volume improve the speed ratio between the impeller and the turbine, such a construction sacrifices the torque available to drive the turbine in the same manner as a reduced volume flow path.

SUMMARY OF THE PRESENT INVENTION

The present invention overcomes the above-mentioned disadvantages by providing a squashed torus shape which is configured with respect to a meanline design path modified as necessary to accommodate a desired axial offset corresponding to the degree of squash or shortening of the axial width of the median section relative to the torus dimension perpendicular to the axis. Both the method for modifying the flow path by adjustment of the meanline design path and a torque converter construction having a flow path which results from application of the method are described in the present application.

The torque converter construction is applicable to conventional design criteria constructions wherein the flow path volume is constant, although it may be appreciated that the method and the product are not so limited. In the preferred embodiment, the torque converter produced according to the method has a constant flow volume relationship and exhibits substantially less loss in converter efficiency and less changing K factor than anticipated based on a review of previous squashed torus designs constructed in accordance with conventional design methods and known torque converter structures. Moreover, the resulting torque converter flow path shape provides a desired amount of reduced axial dimension without sacrificing fuel economy or performance as was expected from previous comparisons.

In practicing the method, a median section through the axis of the torus exhibits a generally annular flow path which is configured with a meanline design path consisting of an inner radius and outer radius connected by a tangent line positioned in accordance with the desired axial offset. A plurality of element lines perpendicular to the curvature of the design path are positioned at equal length increments along the path so that the radially inner and outer torus contours in the median section can be determined along each element line from a selected meanline design path. When the meanline design path has been adjusted for conformity with the maximum allowable axial offset, the outer design path radius is then maximized to provide the largest possible turning radius at the impeller exit and the turbine entrance to promote smooth fluid flow.

Maximizing the design path length for a predetermined axial offset provides a longer distance for smoother blade curvature in the impeller or turbine structures along the design path. The outer radius is maximized relative to the inner radius and may require slight decreases in the inner radius to avoid a design configuration which exceeds the maximum allowable torus width. The relative variation of the outer and inner radii of the meanline design path continues until the outer contour of the flow path includes a single maximum offset point and tapers smoothly inwardly as the radial distance from the axis of the torus increases from the maximum axial offset point.

Preferably, this torus design method is used for axially squashed torus torque converters where the maximum width W of the torus divided by twice the maximum outer radial distance (2R8) from the torus axis is less than 0.32 and wherein the maximum width W of the torus divided by the total torus height H2 is less than 1.0. In addition, it is preferable that the total torus flow area A is less than 0.25 times the circular sweep area generated by rotating the maximum radial distance R8 of the flow path about the center of rotation in a plane perpendicular to the axis of rotation, i.e., A is less than 0.25 $\pi$ times the square of the outer torus radius $(R8)^2$. Furthermore, it is preferable that the flow area is constant at each of the element lines.

As a result, the present invention provides a torque converter having a reduced axial dimension without sacrificing the torque ratio and speed ratio of the torque converter as would be expected by comparison of previously known torque converter designs having reduced axial dimensions. Moreover, the efficiency and performance of the torque converter provides fuel economy and performance which is relatively consistent with conventionally designed, full toroidal flow paths in which the torus flow area is determined by conventional methods.

BRIEF DESCRIPTION OF THE DRAWINGS

The present invention will be more clearly understood by reference to the following detailed description when read in conjunction with the accompanying drawing in which like reference characters refer to like parts throughout the views and in which.

DETAILED DESCRIPTION OF THE PREFERRED EMBODIMENT

Figures 1, 2:
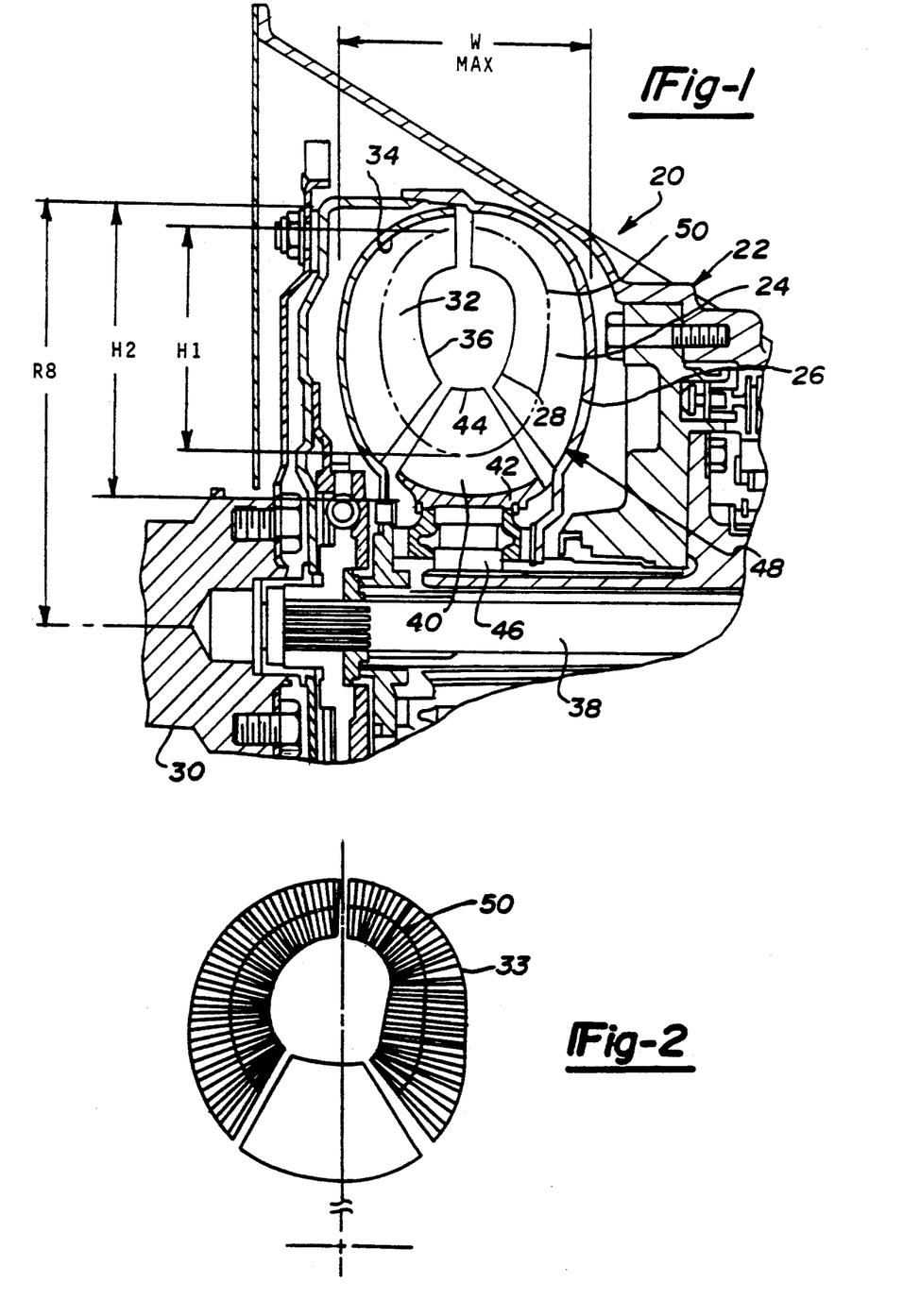
FIG. 1 is a fragmentary, median sectional view of a torque converter construction showing a meanline design path employed in the method and product according to the present invention.
FIG. 2 is a partial, sectional view of a median section showing a further modification of the meanline design path in accordance with the present invention.

Referring first to FIG. 1, a torque converter 20 according to the present invention is thereshown in an automatic transmission housing 22. In a conventional manner, an impeller 24 having an outer wall 26 and an inner wall 28 is coupled to an output shaft 30 from an engine (not shown) for rotation therewith. A turbine 32 having an outer wall 34 and an inner wall 36 is coupled to a rotatably mounted shaft 38 forming an input to the speed change mechanisms of the transmission. A stator 40 having an outer wall 42 and an inner wall 44 is mounted by means of a one-way clutch 46 in the housing 22. The impeller 24, turbine 32 and the stator 40 form a toroidal flow path 48 having a generally annular shape when viewed as a median section as shown in FIG. 1.

A meanline design path 50 shown in FIG. 1 represents a series of points at which one-half of the torus flow area at that point extends toward the outer walls defining the flow path 48, and at which one-half of the torus flow area of the flow path extends toward the inner wall of the flow path 48. The meanline design path 50 shown in FIG. 1, and discussed in greater detail in the following description, demonstrates a squashed torus design in which axial shortening of the torus width W is applied equally to the design of the impeller 24 and the turbine 32. In the representation shown in FIG. 2, the reduced axial dimensioning has been applied to one side of the meanline design path, for example, adjustment of the meanline design path through the impeller 33 only. In either event, adjustment of the flow path 48 by modification of the meanline design path in accordance with the present invention provides performance substantially the same as a full torus converter of conventional design while providing an axial reduction in the size of the torque converter.

Figure 3:
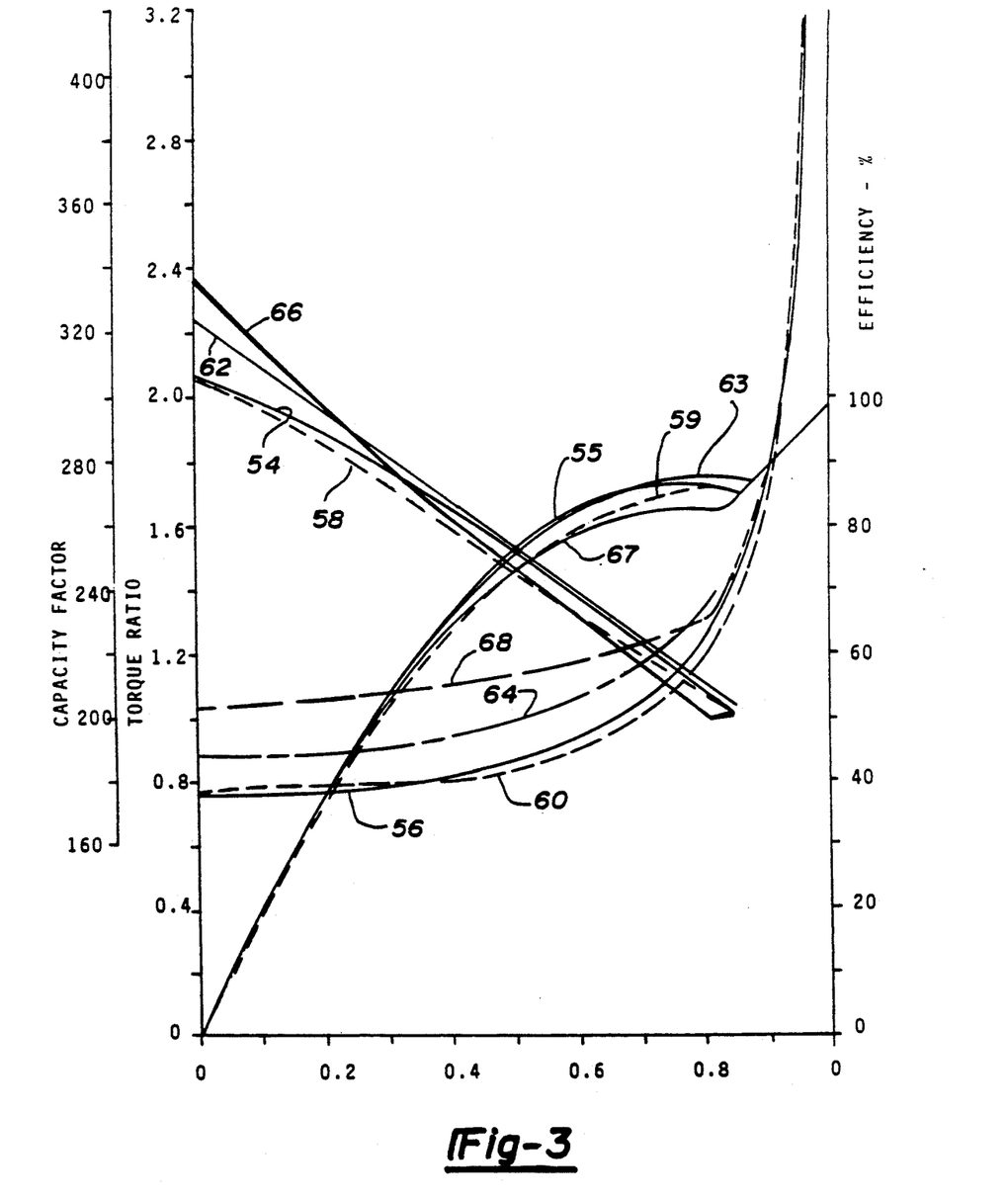
FIG. 3 is a graphical comparison of the torque converter constructed in accordance with the present invention and a previously known torque converters of conventional design.

As shown in FIG. 3, lines 54, 55 and 56 represent the operation of the standard torque converter having a full torus without axial reduction and designed in accordance with conventional criteria. Lines 58, 59 and 60 represent performance characteristics of a double squashed torque converter of the type shown in FIG. 1 wherein both the impeller and the turbine sides of the torus flow path have been axially reduced. Lines 62, 63 and 64 represent performance characteristics of a torque converter with an impeller design shown in FIG. 2 wherein the axial reduction is applied to the impeller side of the toroid. Lines 66, 67 and 68 represent a torque converter having a 14 percent axial reduction where the flow path is configured only in accordance with conventional criteria, and demonstrates the performance deficiencies which are avoided by axial reduction of the torus in accordance with the present invention.

Figure 4:
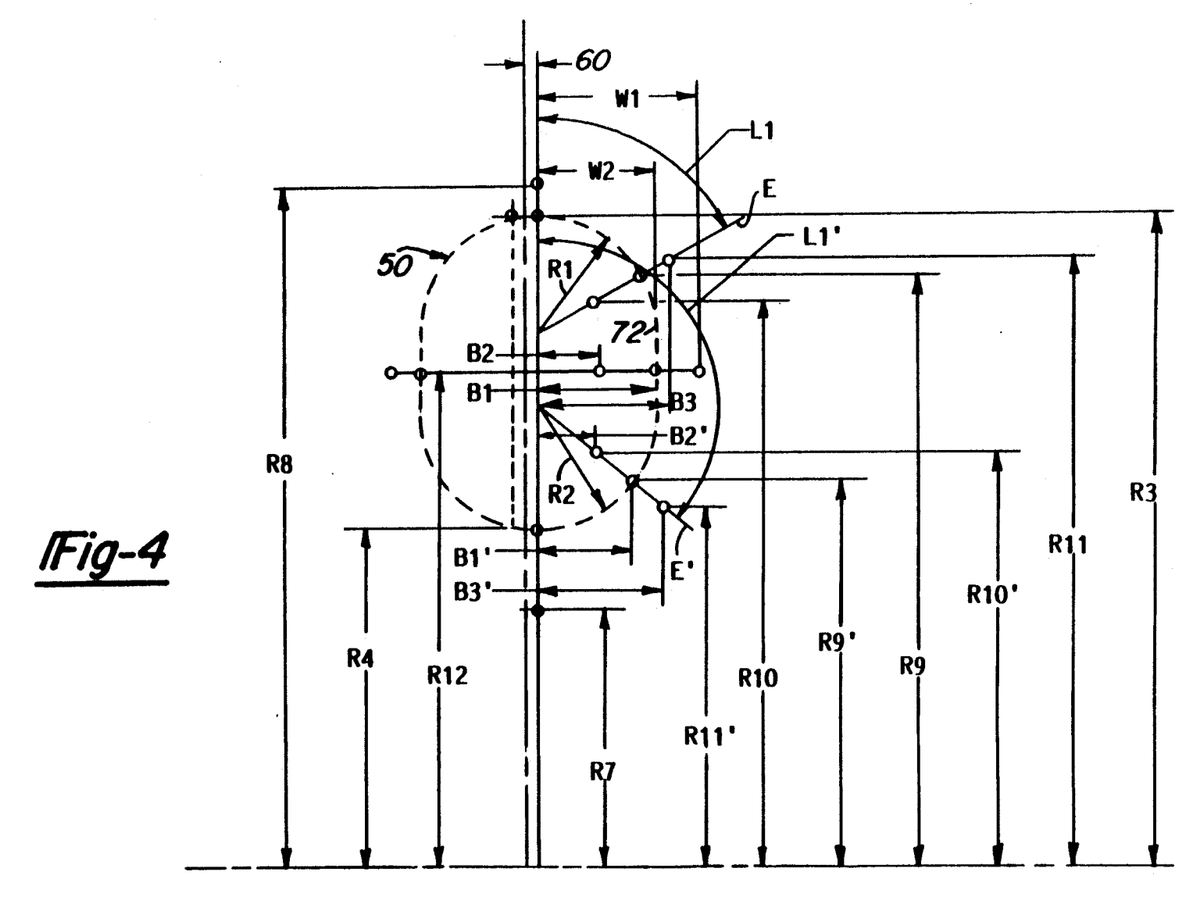
FIG. 4 is a pictorial representation of the meanline design path and dimensional parameters used in accordance with the present invention.

Referring now to FIG. 4, it is to be understood that the method for designing the torque converter differs from the previously known practice of designing the flow path 48 after establishing the outer contour per vehicle packaging space limitations. In particular, the method of the present invention creates an initial meanline design path consisting of an outer radius R1, an inner radius R2 and a connecting tangent line 72. Each radius R1 and R2 is axially offset from the centerline of the torus by a gap 60. The outer radius R1 and the inner radius R2 of the meanline design path are set equal to the maximum allowable design path offset W2. An initial assumption is made that the maximum value of torus width W will occur at the center of the torus height H2 (FIG. 1) at a radial location R12 which is equal to one-half the sum of R3 and R4. A maximum allowable design path offset W2 is equal to the maximum axial offset W1 less the quantity of total torus flow area A required divided by the quantity $4\pi$ times the radius R12. It will be understood that the torus flow area at the radius R12 location is equal to the surface area of a cylinder.

Preferably, the design method for the axially reduced torus also sets the sum of the outer radius R1 and the inner radius R2 at less than the height H1 (FIG. 1) of the meanline design path 50. In addition, the maximum torus width W (FIG. 1) divided by twice the maximum flow path radius R8 is less than 0.32 while the maximum torus width W divided by the maximum height H2 of the torus is less than 1.0. The radially innermost and outermost locations of the meanline design path 50 are at points on the meanline calculated from a predetermined distance from the radius from the torus axis of rotation. Accordingly, the outermost radius R3 equals the square root of the quantity of the square of maximum flow path radius (R8$^2$) minus the torus flow area (A)/2 $\pi$, while the innermost radius R4 is equal to the square root of the quantity of the square of innermost radius from the rotation axis (R7$^2$) plus the torus flow area (A)/2 $\pi$.

The total length of the meanline design path is divided into a predetermined number of equal length increments, preferably in the range of 20-80 increments. At each equal length increment, the angle L1 of an element line E (two shown) perpendicular to the curvature of the design path is established.

Figure 5:
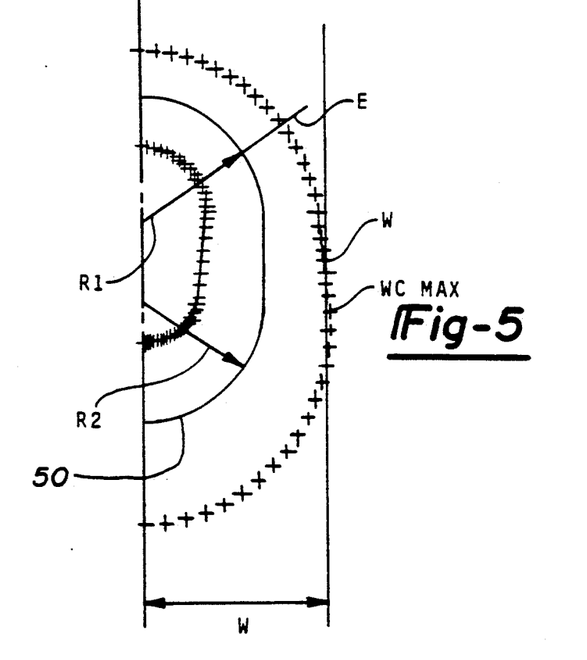
FIG. 5 is a pictorial representation similar to FIG. 4 but demonstrating a further step in the method of employing the meanline design path for configuration of the flow path in accordance with the present invention.

As shown in FIG. 5, the outer and inner flow path boundary points along each element line E are determined by requiring that one half of the torus flow area A required at an element line be outside the meanline design path 50 and that one half of the torus flow area at the element line E be positioned inwardly of the meanline design path 50. The method used for determining the torus flow area generated at an element line may be based on conventional design criteria and, in the preferred embodiment, is given by the formula for the surface of revolution of the frustum of a right circular cone. Accordingly, the radius of the outermost flow path point along an element line E, for example, R11 in FIG. 4, will be understood to be equal to $\sqrt{(R9)^2 + (A/2\pi)\cos L1}$, wherein R9 is the radius from the rotation axis to the meanline design path point along the element line E, and A is the total torus flow area. Similarly, the radius R10 from the center axis to the innermost boundary point along the element line is equal to the $\sqrt{(R9)^2 - (A/2\pi)\cos L1}$. The axial torus offset at each element line E is interiorly defined by B2, where $B2 = B1 - (R9 - R10)\tan L1$ and exteriorly defined by B3, where $B3 = B1 + (R11 - R9)\tan L1$.

The calculation is repeated along each of the predetermined number of element lines including the special case where L1=90° and R9=R10=R11, where the distance $B2 = B1 - A/4\pi(R9)$ and $B3 = B1 + A/4\pi(R9)$. These repeated calculations may be generated on a computer by a program which then provides a representation of the flow path boundaries along each element line as shown in FIG. 5. Preferably, the design may be represented on the computer screen as a listing of results from a plurality of numerical calculations which also trigonometrically evaluate numerical indicia representing the actual offset WC. For example, at L1' where L1>90° and <180°, the cosine becomes negative and renders R10'>R9'>R11', although B2' remains <B3', as shown in FIG. 4.

Figure 6:
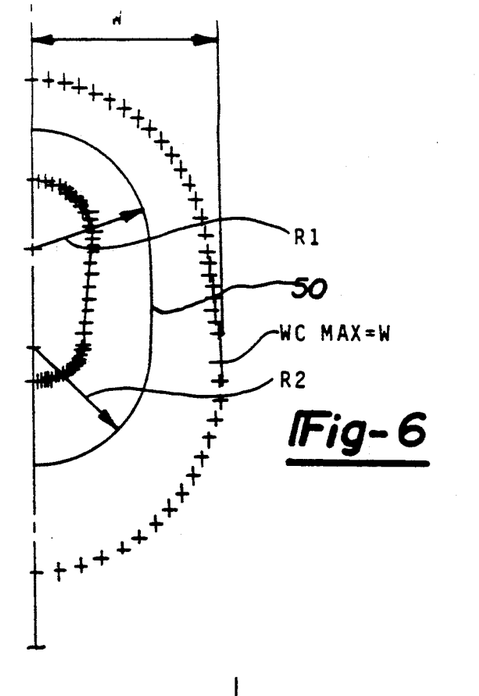
FIG. 6 is a pictorial representation similar to FIG. 5 but showing a further step in the method of employing the meanline design path according to the present invention.

This initial series of calculations will result in an outer dimensional representation, for example, a list of numerical representations by which the resulting maximum offset value WC can be compared with the maximum allowable offset value W. It may be appreciated that as shown in FIG. 5, the maximum value of offset WC resulting from the calculations with the initially set parameters exceeds the allowable maximum offset W, and the maximum actual offset WC occurs at a radius less than the radius R12 as previously assumed. Accordingly, radii R1 and R2 are now decreased equally until the dimensional representation provides a maximum axial offset WC equal to the maximum allowable offset W, as shown in FIG. 6.

Figure 7:
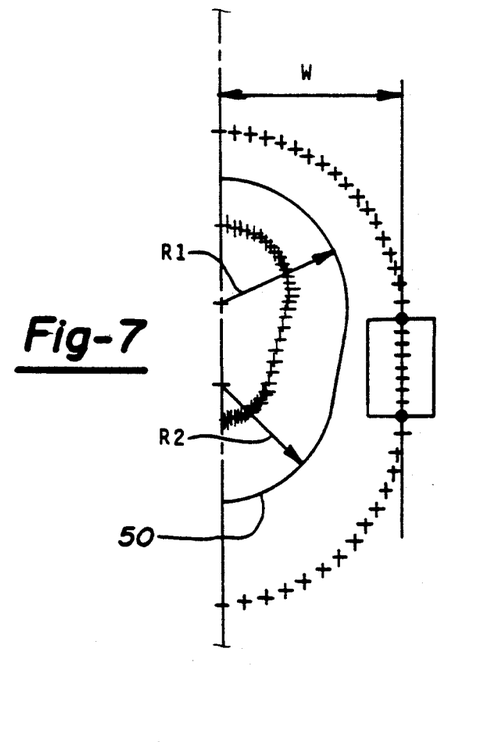
FIG. 7 is a pictorial representation similar to FIG. 6 but demonstrating a further step in the method according to the present invention.
Figure 8:
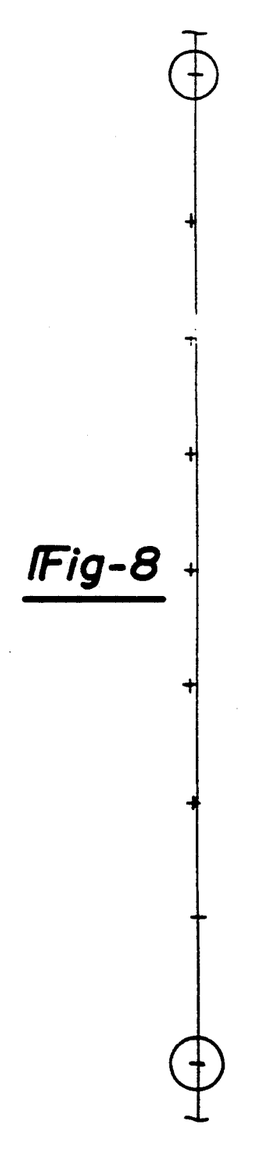
FIG. 8 is an enlarged representation of the view outlined at 8 in FIG. 7.
Figure 9:
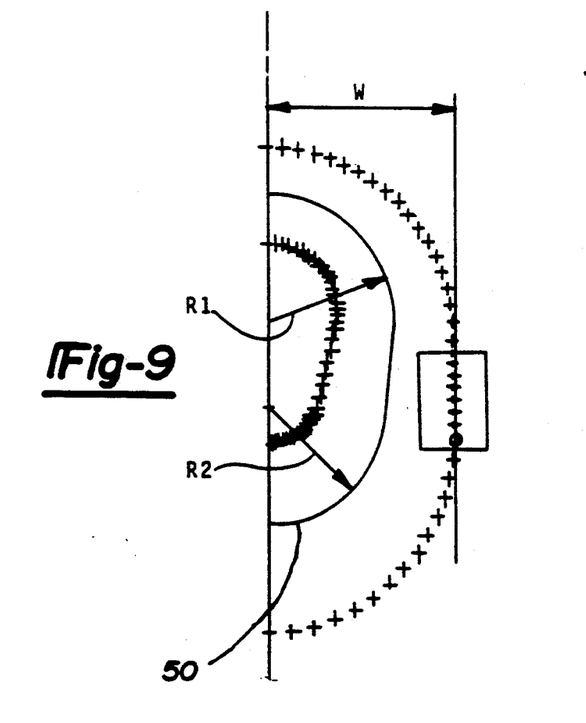
FIG. 9 is a pictorial representation similar to FIG. 7 but demonstrating a further step in the method according to the present invention.
Figure 10:
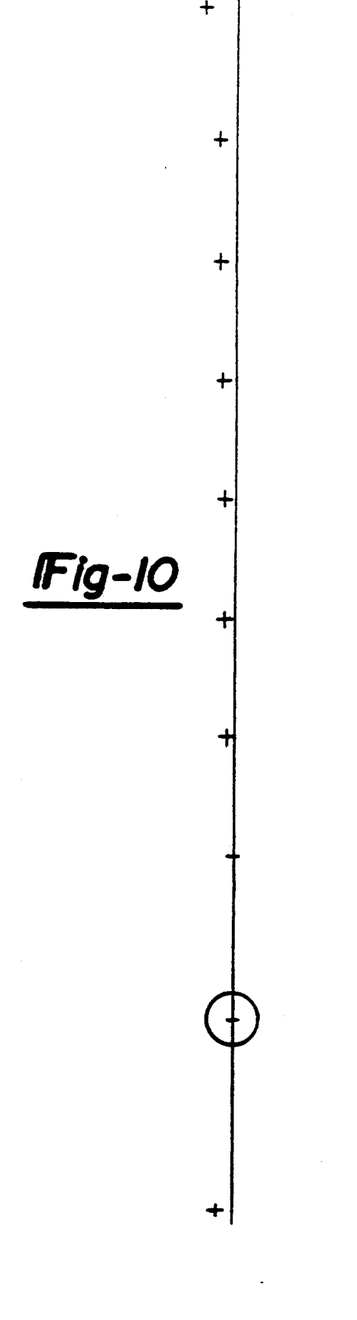
FIG. 10 is an enlarged representation of a portion of FIG. 9 shown outlined at 10.

A further step in the method, as represented in FIG. 7, is to maximize R1. Accordingly, R1 is incrementally increased relative to R2 and the trial calculations are continued until two maximum offset points WC occur at the predetermined maximum axial offset W and a concave arc is formed between these two aligned points. A relative reduction of the inner radius R2 with respect to the outer radius R1 may be necessary in order to realize this outer contour condition without exceeding the allowable limit W as R1 is increased. However, as shown in FIGS. 9 and 10, a single maximum offset point WC=W is desired for more uniform fluid flow through the flow path 48. Consequently, once the outer radius R1 has been increased relative to R2 so as to provide two outer maximized points WC of intersection with the maximum axial offset W without WC at any element lines exceeding that dimension, the outer radius R1 is reduced slightly to provide a smooth tapering curvature as shown in FIGS. 9 and 10. With the aid of a computer, this outer dimensional representation may comprise a listing of a plurality of numbers corresponding to the axial offset WC at each of the element lines.

Figure 11:
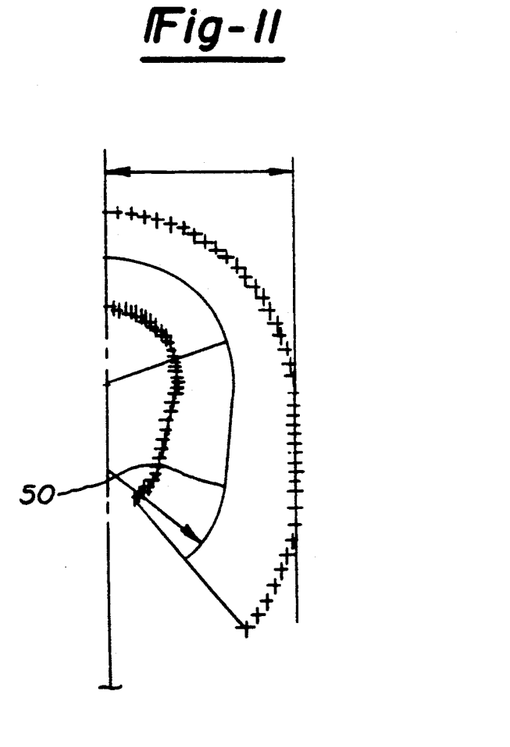
FIG. 11 is a representation similar to FIGS. 5, 6, 7 and 9 but demonstrating a further step according to the present invention.

A further refinement of the method comprises an additional step discussed in relation to the drawing representation of FIG. 11. While in the above discussion the torus was initially designed as a full 180° shape, the flow path length may be shortened at an element line adjacent the position for the stator 40 so that a new redefined path length for the element to be formed is calculated for a single one of the elements, i.e., the impeller or turbine element, within the flow path. The new, shortened design path length is calculated and again divided into a predetermined number of equal increments, preferably the same number in which the 180° shape design path was divided. The shape of the inner and outer contour will stay the same as previously established throughout the recalculation, but the coordinates used to plot the contour will change. The correspondingly numbered plurality of element lines provides a more precise representation of the design within the shortened path. By having the element lines intersect the meanline design path 50 at equal length increments, calculation of the blade curvature in the radial view is made easier. In any event, the resulting design shape may then be plotted accurately to represent the shape of the flow path defined by the turbine, impeller and stator elements to be formed.

Figure 12:
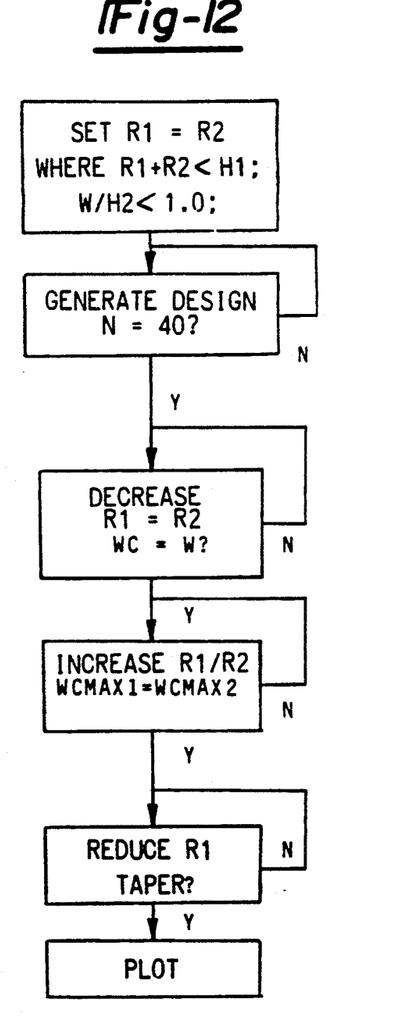
FIG. 12 is a flow diagram of preferred computer program functions for practicing the method of the present invention.

Referring now to FIG. 12, the flow chart represents a computer program used to employ the method discussed above in order to represent the design by listing of numerical values as discussed above.

Having thus described the important steps of the method and the structural features of the preferred design, it is to be understood that the design criteria has provided a torque converter which provides greater efficiency and maintains available torque in a manner not previously expected. In particular, fuel economy comparisons between a full torus converter and squashed torus converters, including double-sided axial reduction of 20 percent as shown in FIG. 1, and a design having a 20 percent axial reduction applied to the impeller, resulted in remarkably consistent performance projections. For example, city driving fuel economy was projected to be 22.1, 22.0 and 22.2 miles per gallon, respectively. Under highway or high speed conditions, fuel economy projections of 34.1, 34.0 and 34.2 miles per gallon, respectively, were achieved. Moreover, the combined high speed and low speed driving conditions resulted in projections of 25.8, 25.7 and 25.8 miles per gallon, respectively.

In addition, wide-open throttle performance comparisons for a selected vehicle with these converter constructions resulted in 0–4 second time period distance projections of 84.4, 83.1 and 86.2 feet, respectively, from an at-rest position. At a 0–10 second interval, distances of 467.0 feet, 464.0 feet and 473.0 feet, respectively, were projected. Peak acceleration comparisons exhibited 16.0 feet/sec.$^2$, 15.7 feet/sec.$^2$, and 16.3 feet/sec.$^2$ acceleration projections, respectively. Furthermore, 0–60 mph times for each of these configurations resulted in the comparable times of 11.3 seconds, 11.4 seconds, and 11.2 seconds, respectively.

In contrast, the graphical data in FIG. 3 reflects that a squashed torus design that did not employ the design parameters of the present invention had a substantially greater slope in capacity factor and requires substantially greater input torque than the full torus design and the squashed designs according to the present invention. As a result, it will be understood that the design according to the present invention provides more efficiency than would be expected with torque converters designed only in accordance with conventional design criteria. Moreover, the design does not limit the maximum torque available as in known systems such as those where the flow area has been varied throughout the flow path in order to reduce turbulence.

Having thus described the present invention, many modifications thereto will become apparent to those skilled in the art to which it pertains without departing from the scope and spirit of the present invention as defined in the appended claims.

What is claimed is:

1. A torque converter having an impeller, a turbine and a stator forming a torus, wherein the torus has a median section having its radial dimension exceeding its axial dimension, and the torus having an axial dimension fixed at a predetermined axial offset, wherein at least one of said impeller and said turbine is configured as a flow path portion defined by a meanline design path having an outer radius and an inner radius, and wherein the outer radius is greater than the inner radius.

2. A torque converter with an impeller, a turbine and a stator defining a generally toroidal flow path with a fixed axial offset, formed by the method comprising:
representing an initial meanline design path for the toroidal flow path with a fixed axial dimension less than its radial dimension, said initial meanline design path having an outer radius and an inner radius,
wherein said outer radius is initially set equal to said inner radius;
generating an outer dimensional representation of the outermost dimensional boundary of said flow path by equalizing the torus flow area exteriorly of said initial meanline design path with the torus flow area interiorly of said initial design path along a plurality of incrementally spaced element lines;
generating a second outer dimensional representation by simultaneously reducing said inner and outer radii until a single axial component of said second outer dimensional representation corresponds with said fixed axial offset;
generating a third dimensional representation by gradually increasing said outer radius relative to said inner radius until said third outer dimensional representation generates a second maximum axial component corresponding to the first maximum axial component;
generating a fourth outer dimensional representation by reducing said outer radius so that said second maximum axial component is retracted from said fixed axial offset to a tapering contour; and
constructing the physical interior and exterior boundaries of said flow path in accordance with said fourth dimensional representation.

3. The invention as defined in claim 2 and further comprising:
shortening the meanline design path length by truncating the meanline design path at an element line having a predetermined angular orientation;
and redefining said fourth dimensional representation within the shortened meanline design path at a second plurality of incrementally spaced element lines greater than the number of element lines within said shortened design path during generation of said first outer dimensional representation.

4. The invention as described in claim 3 wherein said second plurality corresponds to the number of said plurality of element lines during generation of said first outer dimensional representation.

5. The invention as defined in claim 3 wherein said predetermined angular orientation is adjacent the stator position of the torque converter.

6. The invention as defined in claim 2 wherein each said generating step comprises setting the outermost boundary of the torus flow area at a point along an element line so that one-half the torus flow area at said element line extends outwardly of the meanline design path, and calculating the outermost axial distance of said point.

7. The invention as disclosed in claim 2 wherein said representing step further comprises the initializing of torus shape with a maximum axial width-to-torus diameter ratio of less than 0.32.

8. The invention as disclosed in claim 2 wherein said representing step further comprises setting the torus flow area at a value less than $0.25 \pi(R8)^2$, wherein R8 equals the maximum radial dimension of the flow path.

9. The invention as disclosed in claim 2 wherein said representing step further comprises setting the ratio of the maximum axial width to the torus height at less than 1.0.

10. The invention as described in claim 2 wherein said defining step comprises limiting the design path offset to $W2 = W1 - A/4 \pi(R12)$ wherein W1 is the maximum allowable axial offset of the flow path and R12 equals the radial distance to the radial center of the meanline design path.

11. The invention as described in claim 10 wherein said defining step comprises setting said outer radius and said inner radius equal to the maximum meanline design path offset W2.

12. The invention as described in claim 2 wherein each of said generating steps comprises listing a plurality of numerical indicia representing the outermost boundary points of said flow path at each element line.

13. The invention as described in claim 12 wherein each of said generating steps comprises calculating the radial distance on the element line as equal to $\sqrt{(R9)^2 + (A/2\pi) \cos L1}$, wherein R9 equals the radial distance to the meanline design path at each element line, A is the torus flow area at the element line and L1 is the angle of the element line from a line perpendicular to the torus axis.

14. The invention as described in claim 2 wherein said designating step comprises calculating the outer boundary of the flow path as the radial distance along each element line equal to $\sqrt{(R9)^2(A/2\pi)\cos L1}$, and calculating the inner boundary of the flow path as the radial distance on the element line equal to $\sqrt{(R9)^2-(A/2\pi)\cos L1}$, where R9 equals the radial distance to the meanline design path at each element line, A is the torus flow area at the element line and L1 is the angle of the element line from a line perpendicular to the torus axis.

15. The invention as described in claim 2 wherein said constructing step comprises constructing an impeller, a turbine and a stator, each with interior and exterior walls.

* * * * *

UNITED STATES PATENT AND TRADEMARK OFFICE
CERTIFICATE OF CORRECTION

PATENT NO. : 5,152,139

DATED : October 6, 1992

INVENTOR(S) : Gene R. Becraft

It is certified that error appears in the above-identified patent and that said Letters Patent is hereby corrected as shown below:

Column 9, line 8, the formula should read as follows:

$$\sqrt{(R9)^2 + (A/2\pi)\cos L1}$$

Column 9, line 10, and Column 10, line 1, the formula should not be truncated and should read as follows:

$$\sqrt{(R9)^2 - (A/2\pi)\cos L1}$$

Signed and Sealed this

Twenty-first Day of September, 1993

Attest:

BRUCE LEHMAN

Attesting Officer     Commissioner of Patents and Trademarks